United States Patent
Katou et al.

(10) Patent No.: US 12,441,917 B2
(45) Date of Patent: Oct. 14, 2025

(54) ELECTROCONDUCTIVE ADHESIVE

(71) Applicant: OSAKA SODA CO., LTD., Osaka (JP)

(72) Inventors: Ryo Katou, Osaka (JP); Masatoshi Okuda, Osaka (JP); Junichirou Minami, Osaka (JP); Takamichi Mori, Osaka (JP)

(73) Assignee: OSAKA SODA CO., LTD., Osaka (JP)

( * ) Notice: Subject to any disclaimer, the term of this patent is extended or adjusted under 35 U.S.C. 154(b) by 0 days.

(21) Appl. No.: 18/040,624

(22) PCT Filed: Sep. 3, 2021

(86) PCT No.: PCT/JP2021/032519
§ 371 (c)(1),
(2) Date: Feb. 3, 2023

(87) PCT Pub. No.: WO2022/070778
PCT Pub. Date: Apr. 7, 2022

(65) Prior Publication Data
US 2023/0303895 A1    Sep. 28, 2023

(30) Foreign Application Priority Data

Sep. 30, 2020    (JP) .................. 2020-164209

(51) Int. Cl.
*C09J 9/02* (2006.01)
*C08K 3/08* (2006.01)
*C09J 11/04* (2006.01)

(52) U.S. Cl.
CPC .................. *C09J 9/02* (2013.01); *C08K 3/08* (2013.01); *C09J 11/04* (2013.01); *C08K 2003/0806* (2013.01); *C08K 2201/011* (2013.01)

(58) Field of Classification Search
CPC ....... H01B 1/22; C09J 9/02; C08K 2003/0806
See application file for complete search history.

(56) References Cited

U.S. PATENT DOCUMENTS

2011/0140162 A1    6/2011  Okada et al.
2017/0043396 A1*   2/2017  Koduma .............. C09D 11/101
(Continued)

FOREIGN PATENT DOCUMENTS

JP    2015-159096 A    9/2015
JP    2020-119700 A    8/2020
(Continued)

OTHER PUBLICATIONS

International Search Report in PCT/JP2021/032519 dated Nov. 22, 2021.
(Continued)

*Primary Examiner* — Khanh T Nguyen
(74) *Attorney, Agent, or Firm* — Knobbe, Martens, Olson & Bear, LLP

(57) ABSTRACT

The present invention provides an electroconductive adhesive which is desirably sintered at low temperatures even without pressurization during the sintering of the electroconductive adhesive, and which forms a sintered body that has high denseness and high mechanical strength (shear strength) if used as an electroconductive adhesive. An electroconductive adhesive which contains a solvent and silver particles that have an average particle diameter within the range of from 20 nm (inclusive) to 500 nm (exclusive), wherein the moisture content in the electroconductive adhesive is 1,300 ppm or less.

2 Claims, 3 Drawing Sheets

(56) References Cited

U.S. PATENT DOCUMENTS

2019/0047046 A1   2/2019  Masuyama et al.
2020/0172767 A1   6/2020  Mori et al.
2021/0324218 A1   10/2021 Ohshima et al.
2021/0346949 A1   11/2021 Mori et al.

FOREIGN PATENT DOCUMENTS

| JP | 2020-136580 A | 8/2020 |
| WO | WO 2010/018712 A1 | 2/2010 |
| WO | WO 2017/204238 A1 | 11/2017 |
| WO | WO 2020/045111 A1 | 3/2020 |
| WO | WO 2020/050194 A1 | 3/2020 |

OTHER PUBLICATIONS

Extended European Search Report for App. No. 21875080.0, dated Aug. 1, 2025 (in 9 pages).

\* cited by examiner

ELECTROCONDUCTIVE ADHESIVE

TECHNICAL FIELD

The present invention relates to an electroconductive adhesive, a sintered body of the electroconductive adhesive, and an electronic component including the sintered body between members.

BACKGROUND ART

Electroconductive adhesive such as a die bonding agent are joining materials used for electronic components such as semiconductors, LEDs, and power semiconductors. As a joining method, joining by pressurization and heating, or joining with a substrate by sintering through, for example, heating without pressurization is generally known. In recent years, a non-pressurization joining material is being developed from the viewpoint of simplicity and efficiency of its production process.

One example of the non-pressurization joining material is an electroconductive adhesive containing an epoxy resin. This joining material is used by curing the epoxy resin in a low-temperature treatment and is capable of suppressing generation of voids and improving strength of joining with a substrate (Patent Document 1). However, the epoxy resin itself becomes a resistor to lower electroconductivity and thermal conductivity obtained.

On the other hand, silver particles have been developed in recent years as a joining material not containing a thermosetting resin such as an epoxy resin. The silver particles have a feature of being easily sintered by a heat treatment at a low temperature for a short time. For example, Patent Document 2 discloses a metal paste obtained by kneading a solid content composed of silver particles and a solvent, in which the solid content is composed of silver particles including 30% or more of silver particles having a particle size of 100 to 200 nm based on the number of particles, and the silver particles constituting the solid content are bonded with an amine compound having a total carbon number of 4 to 8 as a protective agent. According to the metal paste, the silver particles can be sintered in a low temperature range, and in addition thereto, a sintered body having low resistance and a sintered body having excellent thermal conductivity can be Ruined.

PRIOR ART DOCUMENT

Patent Documents

Patent Document 1: WO 2010/18712 A
Patent Document 2: Japanese Patent Laid-open Publication No. 2015-159096

SUMMARY OF THE INVENTION

Problems to be Solved by the Invention

In the field of electroconductive adhesives, in order to reduce voids of a sintered body obtained by applying an electroconductive adhesive to a member (such as a substrate or a semiconductor chip used for an electronic component) and sintering the electroconductive adhesive (to increase denseness), pressurizing during sintering (pressure is, for example, about 10 to 30 MPa) is generally performed. By sintering the electroconductive adhesive while pressurizing, voids of the sintered body can be reduced. When there are many voids in the sintered body, there is a problem in terms of reliability, for example, a mechanical strength (shear strength) becomes insufficient, or cracking or chipping is easily generated in the sintered body. On the other hand, there are also problems in that pressurizing during sintering gives a damage to the member coated with the electroconductive adhesive, special equipment is required for pressurizing, and the like. When the sintered body is formed on a semiconductor chip or the like having a complicated structure, there is also a problem in that the electroconductive adhesive cannot be pressurized.

Therefore, there has been a demand for development of an electroconductive adhesive capable of forming a sintered body having high denseness and a high mechanical strength (shear strength) even without pressurization during sintering.

The electroconductive adhesive is generally sintered at a sintering temperature of about 300° C., but there is a demand for development of an electroconductive adhesive which can be sintered at a lower temperature (for example, a sintering temperature of 250° C. or lower), and in which defective portions such as voids, cracking or chipping, and internal cracks are hardly generated.

A main object of the present invention is to provide an electroconductive adhesive which is suitably sintered at a low temperature even without pressurization during sintering of the electroconductive adhesive to form a joined body having high denseness and a high mechanical strength (shear strength). An object of the present invention is also to provide an electroconductive adhesive in which cracking or chipping and voids or cracks are hardly generated during low-temperature sintering. An object of the present invention is also to provide a sintered body of the electroconductive adhesive, and an electronic component including the sintered body between members.

Means for Solving the Problem

The present inventors have conducted intensive studies in order to solve the above problems. As a result, the present inventors have found that, in an electroconductive adhesive containing silver particles and a solvent, when the moisture content in the solvent in the electroconductive adhesive is reduced to 1300 ppm or less, the electroconductive adhesive is suitably sintered at a low temperature even without pressurization during sintering of the electroconductive adhesive, and a sintered body having high denseness and a high mechanical strength (shear strength) is formed. The present inventors have also found that a sintered body in which cracking or chipping and voids or internal cracks are hardly generated. More specifically, as described below, a solvent in an electroconductive adhesive containing silver particles and a solvent may have a moisture content reduced to 1300 ppm or less immediately after purchase of a commercial product, but may not have a moisture content reduced to such a degree. Even when a solvent having a moisture content reduced to 1300 ppm or less is used, the solvent absorbs moisture in the air in a short time during production of the electroconductive adhesive, and the moisture content easily exceeds 1300 ppm. Even after the production of the electroconductive adhesive, the solvent easily absorbs moisture in the air during storage and transportation of the electroconductive adhesive, and during use of the electroconductive adhesive, and the moisture content of the solvent in the electroconductive adhesive easily exceeds 1300 ppm. The present inventors have found these points, and have found that it is very important to set the moisture content in the solvent in the electroconductive adhesive to 1300 ppm or less during use of the electroconductive adhesive in order to solve the above problems. The present inventors have conducted further studies based on the findings, leading to the completion of the present invention.

That is, the present invention provides inventions of the following aspects. Item 1. An electroconductive adhesive containing silver particles 1 having an average particle size in a range of 20 nm or more and less than 500 nm, and a solvent, in which a moisture content of the solvent in the electroconductive adhesive is 1300 ppm or less.

Item 2. The electroconductive adhesive described in item 1, in which an amine compound is attached to surfaces of the silver particles 1.

Item 3. A sintered body of the electroconductive adhesive described in item 1 or 2.

Item 4. An electronic component formed by joining members by the sintered body described in item 3.

Item 5. A method for producing a sintered body, the method including a step of sintering the electroconductive adhesive described in item 1 or 2 at a temperature of 200° C. or higher and 250° C. or lower.

Item 6. A method for manufacturing an electronic component formed by joining members by a sintered body, the method including:

a step of disposing the electroconductive adhesive described in item 1 or 2 between the members; and a step of sintering the electroconductive adhesive at a temperature of 200° C. or higher and 250° C. or lower.

Advantages of the Invention

According to the present invention, it is possible to provide a novel electroconductive adhesive which is suitably sintered at a low temperature even without pressurization during sintering of the electroconductive adhesive to form a sintered body having high denseness and a high mechanical strength (shear strength). According to the present invention, it is possible to foiin a good sintered body in which outgas during sintering smoothly escapes and in which a defect layer (cracking or chipping, and voids or internal cracks) is hardly generated. According to the present invention, it is also possible to provide an electroconductive adhesive containing silver particles and a solvent, a sintered body of the electroconductive adhesive, and an electronic component including the sintered body between members.

EMBODIMENTS OF THE INVENTION

Figure 1:
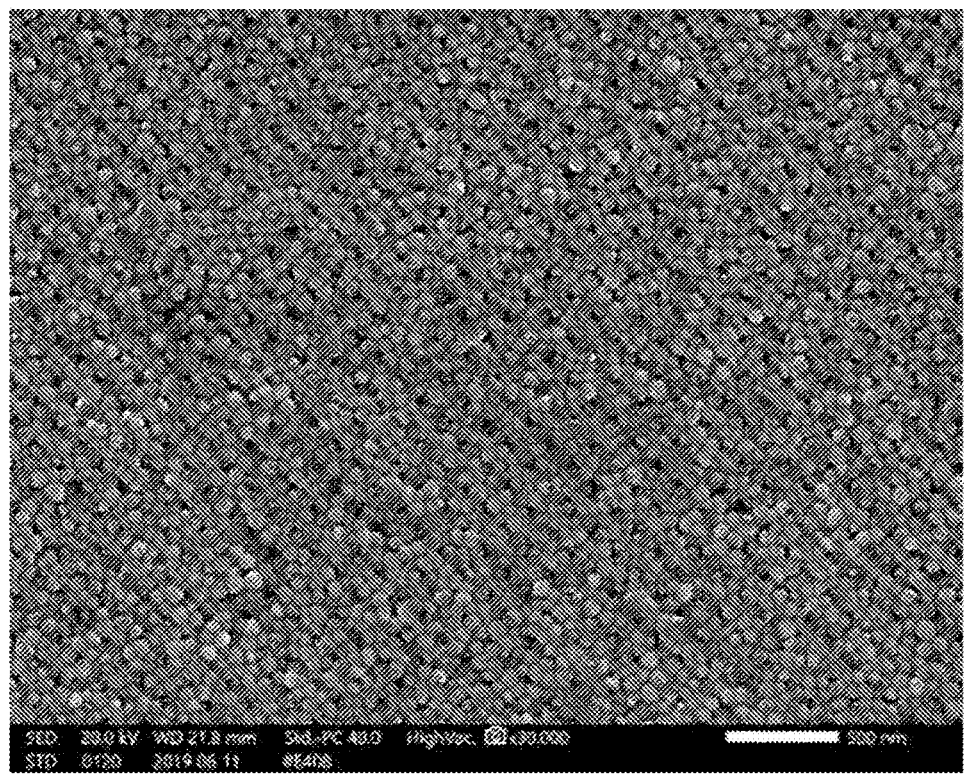
FIG. 1 shows an SEM image of silver particles 1.

An electroconductive adhesive of the present invention contains silver particles 1 having an average particle size in a range of 20 nm or more and less than 500 nm, and a solvent, in which a moisture content of the solvent in the electroconductive adhesive is 1300 ppm or less. Since the electroconductive adhesive of the present invention has such a feature, it is possible to provide a novel electroconductive adhesive which is suitably sintered at a low temperature even without pressurization during sintering of the electroconductive adhesive to foim a sintered body having high denseness and a high mechanical strength (shear strength).

Hereinafter, an electroconductive adhesive, a sintered body of the electroconductive adhesive, and an electronic component including the sintered body between members of the present invention will be described in detail. In the present specification, numerical values connected with "to" refer to the numerical range including the numerical values before and after "to" as a lower limit value and an upper limit value. When a plurality of lower limit values and a plurality of upper limit values are mentioned separately, any lower limit value and any upper limit value can be selected and connected with "to".

1. Electroconductive Adhesive

An electroconductive adhesive of the present invention contains silver particles 1 having an average particle size in a range of 20 nm or more and less than 500 nm and a solvent. When the electroconductive adhesive contains the solvent, flowability of the electroconductive adhesive is enhanced, and the electroconductive adhesive of the present invention is easily disposed at a desired location. Details of the silver particles contained in the electroconductive adhesive of the present invention are as described below.

In the electroconductive adhesive of the present invention, the moisture content of the solvent in the electroconductive adhesive may be 1300 ppm or less. When the moisture content of the solvent in the electroconductive adhesive is set to 1300 ppm or less, the release of outgas generated during sintering becomes smooth, the occurrence of cracking or chipping, voids. or cracks can be suppressed, and necking between particles proceeds better, so that improvement of the shear strength can be expected. The moisture content of the solvent in the electroconductive adhesive may be 1300 ppm or less, and is preferably 1200 ppm or less, more preferably 1100 ppm or less, and further preferably 1000 ppm or less.

The lower limit value of the moisture content of the solvent in the electroconductive adhesive may be equal to or less than a measurement limit value of a method for measuring a moisture content, and may be, for example, 10 ppm or more. When the moisture content of the solvent in the electroconductive adhesive is in the above range, the above-described effect can be obtained.

The moisture content of the solvent in the electroconductive adhesive can be measured by gas chromatography, a Karl Fischer's method, or the like. Specifically, the moisture content of the solvent used for the electroconductive adhesive may be measured by a Karl Fischer's method, and those within the above range may be used.

In order to adjust the moisture content of the solvent in the electroconductive adhesive to 1300 ppm or less, the moisture content in the solvent used for the electroconductive adhesive can be adjusted to 1300 ppm or less before being added to the electroconductive adhesive by using distillation, molecular sieve, alumina, or the like. As described above, a solvent in an electroconductive adhesive containing silver particles and a solvent may have a moisture content reduced to 1300 ppm or less immediately after purchase of a commercial product, but may not have a moisture content reduced to such a degree. Even when a solvent having a moisture content reduced to 1300 ppm or less is used, the solvent absorbs moisture in the air in a short time during production of the electroconductive adhesive, and the moisture content easily exceeds 1300 ppm. Even after the production of the electroconductive adhesive, the solvent easily absorbs moisture in the air during storage and transportation of the electroconductive adhesive, and during use of the electroconductive adhesive, and the moisture content of the solvent in the electroconductive adhesive easily exceeds 1300 ppm. Therefore, the electroconductive adhesive of the present invention is required to have a moisture content in the solvent in the electroconductive adhesive of 1300 ppm or less not only during production but also during use (specifically, at the time of being subjected to sintering). Conventionally, the control of the moisture content of the electroconductive adhesive containing silver particles has not been strictly performed so far, and even when a commercially available solvent in which the moisture content is adjusted to 1300 ppm or less is used for producing the electroconductive adhesive, the solvent absorbs moisture during production of the electroconductive adhesive or during storage, distribution, and use of the electroconductive adhesive, and the moisture content easily exceeds 1300 ppm. Therefore, the solvent or the electroconductive adhesive may be used by being sealed with dry air or nitrogen cylinder air during production, storage, distribution, or use. The humidity of the room during use may be controlled.

Silver Particles 1

The silver particles 1 are in a range of 20 nm to 500 nm. The average particle size of the silver particles 1 may be in a range of 20 nm to 500 nm, but from the viewpoint of more suitably exhibiting the effects of the present invention, the lower limit is preferably 25 nm or more and more preferably 30 nm or more, the upper limit is preferably 500 nm or less, more preferably 450 nm or less, and further preferably 400 nm or less, and the preferred range is 20 to 500 nm, 25 to 500 nm, 30 to 500 nm, 25 to 450 nm, 25 to 400 nm, 30 to 450 nm, 30 to 400 nm, or the like.

In the present invention, the average particle size of the silver particles 1 is a volume-based average particle size measured for 200 randomly selected particles in an SEM image using image analysis software (for example, Macview (manufactured by Mountech Co., Ltd.)). For the SEM observation, a range with a lateral width of 1 to 20 μm is observed at an observation magnification of 5000 to 30000 at an acceleration voltage of 20 kV using an SED mode (secondary electron detector). The longitudinal direction of the SEM image is a width in which 200 or more (usually, about 200 to 300) silver particles are included in a range with a lateral width of 1 to 20 μm. The volume-based average particle size is a value measured assuming that the particles observed in the SEM image are spherical particles having the diameters of the observed particles. A specific measurement method is as described in Examples.

A dry powder of the silver particles 1 has a weight reduction rate of preferably 1.5 wt % or less and more preferably 0.05 to 1.3 wt % at the time of heating from 30° C. to 500° C. by thermogravimetric differential thermal analysis. The method of thermogravimetric differential thermal analysis is as follows.

<Thennogravimetric Differential Thermal Analysis (TG-DTA)>

First, air dried silver particles 1 are prepared. For example, when silver particles 1 are obtained from the electroconductive adhesive and analyzed, 2 g of methanol is added to 1 g of each electroconductive adhesive and sufficiently dispersed, the silver particles 1 are then collected by filtration and air-dried to obtain a dry powder of the silver particles 1, and the silver particle dry powder is used as an analysis target. TG-DTA of the dry powder of the silver particles 1 is measured with a thermogravimetric differential thermal analyzer (for example, HITACHI G300 AST-2). The measurement conditions are as follows: atmosphere: air, measurement temperature: 30 to 500° C., and temperature increase rate: 10° C./min. From the obtained TG-DTA chart, an exothermic peak attributable to binding of the silver particles 1 in TG-DTA analysis and a weight reduction rate at the time of heating from 30° C. to 500° C. by thermal analysis are obtained.

From the viewpoint of more suitably exhibiting the effects of the present invention, the silver particles 1 are preferably surface-treated. That is, the silver particles 1 are preferably surface-treated silver particles.

More specifically, it is preferable that an amine compound is attached to the surfaces of the silver particles 1. The amine compound is attached to the surfaces of the silver particles 1 and can form a protective layer. In the silver particles 1, it is preferable to attach the amine compound so that the average particle size is set in the above specific range.

The amine compound is not particularly limited and can include a primary amine, a secondary amine a tertiary amine, and a diamine compound having two amino groups in one compound, from the viewpoint of more suitably exhibiting the effects of the present invention.

Examples of the primary amine include amines having a straight or branched hydrocarbon group such as ethylamine, n-propylamine, isopropylamine, 1,2-dimethylpropylamine, n-butylamine, isobutylamine, sec-butylamine, tert-butylamine, isoamylamine, n-hexylamine, n-octylamine, 2-octylamine, tert-octylamine, 2-ethylhexylamine, n-nonylamine, n-aminodecane, n-aminoundecane, n-dodecylamine, n-tridecylamine, 2-tridecylamine, n-tetradecylamine, n-pentadecylamine, n-hexadecylamine, n-heptadecylamine, n-octadecylamine, n-oleylamine, 3-methoxypropylamine, 3-ethoxypropylamine, 3-propoxypropylamine, 3-isopropoxypropylamine, 3-butoxypropylamine, N-ethyl-1,3-diaminopropane, N,N-diisopropylethylamine, N,N-dimethyl-1,3-diaminopropane, N,N-dibutyl-1,3-aminopropane, N,N-diisobutyl-1,3-diaminopropane, and N-lauryl diaminopropane.

Examples of the primary amine also include alicyclic amines such as cyclopropylamine, cyclobutylamine, cyclopropylamine, cyclohexylamine, cycloheptylamine, and cyclooctylamine, and aromatic amines such as aniline.

Examples of the primary amine also include ether amines such as 3-isopropoxypropylamine and isobutoxypropylamine.

Examples of the secondary amine include dialkylmonoamines such as N,N-dipropylamine, N,N-dibutylamine, N,N-dipentylamine, N,N-dihexylamine, N,N-dipeptylamine, N,N-dioctylamine, N,N-dinonylamine, N,N-didecylamine, N,N-diundecylamine, N,N-didodecylamine, N,N-distearylamine, N-methyl-N-propylamine, N-ethyl-N-propylamine, and N-propyl-N-butylamine, and cyclic amines such as piperidine.

Examples of the tertiary amine include triethylamine, tributylamine, trihexylamine, dimethyloctylamine, dimethyldecylamine, dimethyllatuylamine, dimethylmyristylamine, dimethylpalmitylamine, dimethylstearylamine, and dilaurylmonomethylamine.

As the amine compound, a diamine compound having two amino groups in one compound can also be used. Examples of the diamine compound include ethylenediamine, N,N-dimethylethylenediamine, N,N'-dimethylethylenediamine, N,N-diethylethylenediamine, N,N'-diethylethylenediamine, 1,3-propanediamine, 2,2-dimethyl-1,3-propanediamine, N,N-dimethyl-1,3-propanediamine, N,N'-dimethyl-1,3-propanediamine, N,N-diethyl-1,3-propanediamine, N,N'-diethyl-1,3-propanediamine, 1 4-butanediamine N,N-dimethyl-1,4-butanediamine, N,N'-dimethyl-1,4-butanediamine, N,N-diethyl-1,4-butanediamine, N,N'-diethyl-1,4-butanediamine, 1,5-pentanediamine, 1,5-diamino-2-methylpentane, 1,6-hexanediamine, N,N-dimethyl-1,6-hexanediamine, N,N'-dimethyl-1,6-hexanediamine, 1,7-heptanediamine, and 1,8-octanediamine.

As the amine compound on the surfaces of the silver particles 1, n-propylamine, isopropylamine, cyclopropylamine, n-butylamine, isobutylamine, sec-butylamine, tert-butylamine, cyclobutylamine, n-amylamine, n-hexylamine, cyclohexylamine, n-octylamine, 2-ethylhexylamine, n-dodecylamine. n-oleylamine, 3-methoxypropylamine, 3-ethoxypropylamine, N,N-dimethyl-1,3-diaminopropane, and N,N-diethyl-1,3-diaminopropane are preferable, and n-butylamine, n-hexylamine, n-octylamine, 3-methoxypropylamine, n-dodecylamine, N,N-dimethyl-1,3-diaminopropane, and N,N-diethyl-1,3-diaminopropane are more preferable.

The attached amount of the amine compound of the silver particles 1 is not particularly limited, but is preferably 1.5 mass % or less and more preferably 1.3 mass % or less with respect to 100 mass % of the mass of the silver particles 1, and the lower limit is preferably 0.05 mass % or more. The content of the amine compound attached to the silver particles 1 can be measured by thermogravimetric differential thermal analysis.

A fatty acid, a hydroxy fatty acid, or the like may be attached to the surfaces of the silver particles 1. The fatty acid is not particularly limited, but is, for example, preferably a fatty acid having an alkyl group with 3 or more and 18 or less carbon atoms and more preferably a fatty acid having an alkyl group with 4 or more and 18 or less carbon atoms. Preferred specific examples of the fatty acid include acetic acid, propionic acid, butyric acid, valeric acid, caproic acid, caprylic acid, 2-ethylhexanoic acid, capric acid, lauric acid, myristic acid, palmitic acid, stearic acid, oleic acid, linoleic acid, and α-linolenic acid. Specific examples of the fatty acid also include cyclic alkyl carboxylic acids such as cyclohexanecarboxylic acid. As the hydroxy fatty acid, a compound having 3 to 24 carbon atoms and one or more (for example, one) hydroxyl groups can be used. Examples of the hydroxy fatty acid include 2-hydroxydecanoic acid, 2-hydroxydodecanoic acid, 2-hydroxytetradecanoic acid, 2-hydroxyhexadecanoic acid, 2-hydroxyoctadecanoic acid, 2-hydroxyeicosanoic acid, 2-hydroxydocosanoic acid, 2-hydroxytricosanoic acid, 2-hydroxytetracosanoic acid, 3-hydroxyhexanoic acid, 3-hydroxyoctanoic acid, 3-hydroxynonanoic acid, 3-hydroxydecanoic acid, 3-hydroxyundecanoic acid, 3-hydroxydodecanoic acid, 3-hydroxytridecanoic acid, 3-hydroxytetradecanoic acid, 3-hydroxyhexadecanoic acid, 3-hydroxyheptadecanoic acid, 3-hydroxyoctadecanoic acid, co-hydroxy-2-decenoic acid, co-hydroxypentadecanoic acid, co-hydroxyheptadecanoic acid, w-hydroxyeicosanoic acid, co-hydroxydocosanoic acid, 6-hydroxyoctadecanoic acid, ricinoleic acid, 12-hydroxystearic acid, and [R-(E)]-12-hydroxy-9-octadecenoic acid. Among them, a hydroxy fatty acid having 4 to 18 carbon atoms and one hydroxyl group at a position (particularly, the 12-position) other than the co-position is preferable, and ricinoleic acid, 12-hydroxystearic acid, and oleic acid are more preferable. Each of the fatty acid and the hydroxy fatty acid may be used singly or may be used in combination of two or more kinds thereof.

In the silver particles 1 of the present invention, the attached amount of the fatty acid or the hydroxy fatty acid is also appropriately adjusted similarly to the amine compound. The specific attached amount of the fatty acid or the hydroxy fatty acid is not particularly limited, but is preferably 1.5 mass % or less and more preferably 1.3 mass % or less, and preferably 0.01 mass % or more with respect to 100 mass % of the mass of the silver particles 1. The content of the fatty acid and the hydroxy fatty acid attached to the silver particles 1 can be measured by differential thermal analysis.

As long as the silver particles 1 of the present invention satisfy the above average particle size, the amine compound, the fatty acid, and the hydroxy fatty acid may be used in combination, or another compound different from these may be attached to the surfaces of the silver particles 1. It is particularly preferable that the amine compound is attached to the surfaces of the silver particles 1 of the present invention.

As the silver particles 1 in the electroconductive adhesive in the present invention, silver particles having an average particle size of 20 to 500 nm may be used singly, or a plurality of silver particles having an average particle size of 20 to 500 nm may be used in combination. When the plurality of silver particles having an average particle size of 20 to 500 nm are used in combination, the ratio thereof may be appropriately adjusted so as to obtain desired physical properties, and for example, when silver particles 1$a$ having a small average particle size and silver particles 1$b$ having a large average particle size in an average particle size range of 20 to 500 nm are used, the ratio of the silver particles 1$a$: the silver particles 1$b$ may be in a range of 1 to 30:70 to 99.

In the electroconductive adhesive of the present invention, as the silver particles, silver particles 2 of 0.5 to 5.5 μm may be contained as necessary in addition to the above-described silver particles 1 having an average particle size of 20 to 500 nm. From the viewpoint of more suitably exhibiting the effects of the present invention, the lower limit of the average particle size of the silver particles 2 is preferably 0.6 μm or more, the upper limit is preferably 3.0 μm or less, more preferably 2.5 μm or less, and further preferably 2.0 μm or less, and the preferred range is 0.5 to 3.0 μm, 0.5 to 2.5 μm, 0.5 to 2.0 μm, 0.6 to 3.0 μm, 0.6 to 2.5 μm, or 0.6 to 2.0 μm.

In the present invention, the average particle size of the silver particles 2 can be measured by a particle size distribution measuring device based on a laser diffraction/scattering method, or can be measured from an electron micrograph, and further can be calculated from the electron micrograph using an image processing apparatus. In general, the average particle size is measured by a laser diffraction method or image analysis of an SEM image (for example, Macview (manufactured by Mountech Co., Ltd.)).

As the silver particles 2 in the present invention, commercially available silver particles may be used, and silver particles synthesized by a known synthesis method may be used.

In the electroconductive adhesive of the present invention, as the silver particles, the silver particles 1 may be used singly, or the silver particles 1 and the silver particles 2 may be used in combination. When the silver particles 1 and the silver particles 2 are used in combination, the ratio of the silver particles 1 and the silver particles 2 (silver particles 1:silver particles 2) may be in a range of 30 to 70:70 to 30, and is preferably in a range of 35 to 65:65 to 35 and more preferably in a range of 40 to 60:60 to 40. When the silver particles 1 and the silver particles 2 are used in combination at a ratio in the above range, a higher shear strength can be obtained.

Solvent

The solvent is not particularly limited as long as it can have a moisture content of 1300 ppm or less and allows the silver particles to be dispersed therein, but preferably includes a polar organic solvent. Examples of the polar organic solvent include ketones such as acetone, acetylacetone, and methyl ethyl ketone; ethers such as diethyl ether, dipropyl ether, dibutyl ether, tetrahydrofuran, and 1,4-dioxane; diols such as 1,2-propanediol, 1,2-butanediol, 1,3-butanediol, 1,4-butanediol, 2,3-butanediol, 1,2-hexanediol, 1,6-hexanediol, 1,2-pentanediol, 1,5-pentanediol, 2-methyl-2,4-pentanediol, 3-methyl-1,5-pentanediol, 1,2-octanediol, 1,8-octanediol, and 2-ethyl-1,3-hexanediol; glycerol; alcohols such as a straight or branched alcohol having 1 to 5 carbon atoms, cyclohexanol, 3-methoxy-3-methyl-1-butanol, and 3-methoxy-1-butanol; fatty acid esters such as ethyl acetate, butyl acetate, ethyl butyrate, ethyl formate, and texanol; glycols or glycol ethers such as polyethylene glycol, triethylene glycol monomethyl ether, tetraethylene glycol monomethyl ether, ethylene glycol monoethyl ether, diethylene glycol monoethyl ether, diethylene glycol dimethyl ether, triethylene glycol dimethyl ether, tetraethylene glycol dimethyl ether, 3-methoxybutyl acetate, ethylene glycol monobutyl ether, ethylene glycol monobutyl ether acetate, ethylene glycol monohexyl ether, ethylene glycol monooctyl ether, ethylene glycol mono-2-ethylhexyl ether, ethylene glycol monobenzyl ether, diethylene glycol monomethyl ether, diethylene glycol monomethyl ether acetate, diethylene glycol monoethyl ether, diethylene glycol monoethyl ether acetate, diethylene glycol monobutyl ether, diethylene glycol monobutyl ether acetate, diethylene glycol monhexyl ether, diethylene glycol mon-2-ethylhexyl ether, polypropylene glycol, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether, and tripropylene glycol monobutyl ether; N,N-dimethylformamide; dimethyl sulfoxide; terpenes such as terpineol; acetonitrile; γ-butyrolactone; 2-pyrrolidone; N-methylpyrrolidone; and N-(2-aminoethyl)piperazine. Among these, from the viewpoint of more suitably exhibiting the effects of the present invention, a straight or branched alcohol having 3 to 5 carbon atoms, 3-methoxy-3-methyl-1-butanol, 3-methoxy-1-butanol, diethylene glycol monobutyl ether, diethylene glycol monobutyl ether acetate, diethylene glycol monohexyl ether, diethylene glycol mono-2-ethylhexyl ether, terpineol, and texanol are preferable.

The solvent may include a non-polar or hydrophobic solvent in addition to the polar organic solvent. Examples of the non-polar organic solvent include straight, branched, or cyclic saturated hydrocarbons such as hexane, heptane, octane, nonane, decane, 2-ethylhexane, and cyclohexane; alcohols such as a straight or branched alcohol having 6 or more carbon atoms; aromatic compounds such as benzene, toluene, and benzonitrile; halogenated hydrocarbons such as dichloromethane, chloroform, and dichloroethane; methyl-n-amyl ketone; methyl ethyl ketone oxime; and triacetin. Among these, saturated hydrocarbon and a straight or branched alcohol having 6 or more carbon atoms are preferable, and hexane, octane, decane, octanol, decanol, and dodecanol are more preferable. The solvent can be used singly or as a mixture of two or more kinds thereof.

When the solvent includes both a polar organic solvent and a non-polar organic solvent, the proportion of the polar organic solvent is preferably 5 vol % or more, more preferably 10 vol % or more, and still more preferably 15 vol % or more, with respect to the total amount of the solvent. The proportion of the polar organic solvent can be set to 60 vol % or less, can also be set to 55 vol % or less, or can also be set to 50 vol % or less. The solvent can also be composed of only a polar organic solvent. The electroconductive adhesive of the present invention has good dispersibility of the silver particles also when containing a large amount of a polar organic solvent as described above.

In the electroconductive adhesive of the present invention, the ratio of the solvent is not particularly limited, but is preferably 20 mass % or less and more preferably about 5 mass % to 15 mass %.

The content of the silver particles contained in the electroconductive adhesive of the present invention is preferably 80 mass % or more and more preferably 85 mass % or more.

The electroconductive adhesive of the present invention can be produced by a method including a step of mixing respective silver particles with a solvent.

In a method for producing an electroconductive adhesive of the present invention, the silver particles of the present invention produced in a solvent in a method for producing silver particles of the present invention described below may be used together with the solvent to foiiu the electroconductive adhesive of the present invention.

In the electroconductive adhesive of the present invention, the shear strength of a sintered body obtained by heating the electroconductive adhesive at 200° C. is preferably 35 MPa or more, more preferably 40 MPa or more, and further preferably 45 MPa or more. The upper limit of the shear strength is, for example, 200 MPa or less. When the silver particles of the present invention are fo ued into an electroconductive adhesive, the shear strength of a sintered body obtained by heating the electroconductive adhesive at 250° C. is preferably 30 MPa or more, more preferably 35 MPa or more, and further preferably 40 MPa or more. The upper limit of the shear strength is, for example, 200 MPa or less. The method for measuring the shear strength of the sintered body is as follows, and specifically, the shear strength is measured by the method described in Examples.

<Shear Strength>

First, a substrate with non-electrolytic silver plating of 0.5 μm on a copper plate is prepared. An electroconductive adhesive (silver particle dispersion of 90 mass % of silver particles and 10 mass % of a solvent (for example, diethylene glycol mono-2-ethylhexyl ether, texanol or the like)) is uniformly applied onto the substrate (surface on which silver plating is formed) to form a coating film such that the thickness of the coating film reaches 50 to 100 μm (adjusted by the thickness of the joined body after sintering). A silicon wafer (size 2 m×2 mm) having a rear surface (surface in contact with the electroconductive adhesive) thereof subjected to gold plating is laminated on the coating film to obtain a laminate. Next, the obtained laminate is heated using a drier (circulation type) under sintering conditions of a predetermined sintering temperature (200° C. or 250° C.) and 60 minutes, and each electroconductive adhesive between the substrate and the silicon wafer is sintered to nine laminates in which the substrate and the silicon wafer are joined with the sintered body interposed therebetween. The thickness of the joined body is 30 to 90 μm, and the film thicknesses of the electroconductive adhesives to be compared are aligned and compared. For each of the obtained laminates, a load is applied to the sintered body under the condition of 0.120 mm/s at room temperature using a bond tester (for example, SS30-WD manufactured by SEISHIN TRADING CO., LTD.), and a die shear test of each laminate is performed to measure the maximum load at break. The maximum load thus obtained is divided by the joining area to obtain a shear strength value. The measurement result is an average value of nine gold-plated silicon wafers whose shear strength has been measured. The sintering time at a predetermined sintering temperature may be 60 minutes or longer, and pre-firing may be performed at 50 to 100° C. for 2 hours or shorter before main sintering at a predetermined sintering temperature.

In the electroconductive adhesive of the present invention, the denseness of a sintered body obtained by heating the electroconductive adhesive at 200° C. is preferably 80% or more and more preferably 85% or more. The upper limit of the denseness is, for example, 95% or less. When the silver particles of the present invention are formed into an electroconductive adhesive, the denseness of a sintered body obtained by heating the electroconductive adhesive at 250° C. is preferably 83% or more and more preferably 85% or more. The upper limit of the denseness is, for example, 97% or less. The method for measuring the denseness of the sintered body is as follows, and specifically, the shear strength is measured by the method described in Examples.

<Denseness>

In the same method as in the method described in the section of <Shear Strength>, a laminate in which a substrate and a silicon wafer are joined with a sintered body interposed therebetween is obtained. Next, the sintered body is embedded in a resin together with the laminate with an epoxy resin (for example, manufactured by Büler), and left to stand still for 24 hours to cure the resin. The resin-embedded laminate is cut with a precision low-speed cutting machine (for example, TechCut4 manufactured by ALLIED HIGH TECH PRODUCTS, INC.), and cross-section milling is performed by an ion milling (for example, manufactured by Hitachi High-Technologies Corporation) (for example, IM4000PLUS manufactured by Hitachi High-Technologies Corporation). The cross-section milling is performed by irradiating ion beams with a swing of ±30° at an argon gas flow rate of 0.07 cm3/min and at a discharge voltage of 1.5 kV and an acceleration voltage of 6 kV. The cross-section of the sintered body obtained by the cross-section milling is observed with a scanning electron microscope to acquire an SEM image. For the SEM observation, a range with a lateral width of 60 μm is observed in a field of view at a magnification of 2000 at an acceleration voltage of 20 kV using an SED mode (secondary electron detector). For the longitudinal direction of the SEM image, the vertical width of the sintered layer of silver is in a range of 30 μm or more and 200 μm or less. This is because when the thickness of the sintered layer of silver is less than 10 μm, mechanical strength may be impaired due to characteristics as a joined body, and when the thickness thereof is more than 200 μm, since the volume of the laminate is increased, it is assumed that outgassing during sintering hardly occurs uniformly, which is disadvantageous from the viewpoint of reliability. This observation range is not limited to a 2 m×2 mm chip or the like, and even a chip having a size of 5 m×5 mm or more is set to the same observation range. When the nonuniformity of the sintered body structure is high, the range with a lateral width of 60 μm and a vertical width of 30 μm or more is observed plural times, and the average value thereof is taken as the denseness. The denseness is calculated by converting the obtained SEM image into two gradations of white and black by binarization software (Imagej) and determining the denseness by the following relational expression.

Denseness (%)=Sintered silver area (number of white pixels)+Sintered body total area {sintered silver area (number of white pixels)+Pore area (number of black pixels)}×100

<Void>

An SEM image of the sintered body is acquired in the same manner as in the measurement of <Denseness>, the SEM image binarized using Imagej is subjected to image processing (analysis of void portions in the binarized image as particles by automatic reading of color difference) using image analysis type particle size distribution measurement software (Macview) (manufactured by Mountech Co., Ltd.), voids of the sintered body are assumed to be spherical, and the number average size of the voids is calculated. At this time, the specific surface area of the sintered body is calculated from the surface area per unit volume of the spherical shape. The void portion is a pore portion generated by outgas or particle growth different from voids or cracks, and the pore portion has a diameter of 50 nm or more and 10 μm or less. Holes that are connected to each other with a diameter of more than 10 μm due to continuous voids are referred to as voids or cracks, and these holes are excluded from the void portions and converted. This is regarded as a value obtained by calculating the connected pores that appear when the cross-sectional SEM image is binarized as described above.

In the electroconductive adhesive of the present invention, voids of a sintered body obtained by heating the electroconductive adhesive at 200° C. have, for example, the following features. The sintered body is formed by the method described in the section of <Shear strength>. The number average size of the voids is, for example, 0.3 to 1.1 μm. The specific surface area of the void is, for example, 0.15 to 1.0 μm². The number average size is calculated by the image processing method using Macview.

2. Method for Producing Silver Particles

An example of the method for producing silver particles contained in the electroconductive adhesive of the present invention is described below.

First, a composition for producing silver particles (composition for preparing silver particles) is prepared. Specifically, a silver compound to be a raw material for silver particles, and as necessary, an amine compound or the like to be attached to the surfaces of the silver particles, and a solvent are prepared. From the viewpoint of more suitably exhibiting the effects of the present invention, examples of a preferred silver compound include silver nitrate and silver oxalate, and silver oxalate is particularly preferable. Examples of the solvent include the same solvents as those exemplified as the solvent to be blended in the electroconductive adhesive described below. Next, these respective components are mixed to obtain a composition for preparing silver particles. The proportion of each of the components in the composition is appropriately adjusted. For example, the content of silver oxalate in the composition is preferably set to about 20 to 70 mass % with respect to the total amount of the composition. When the amine compound is attached to the surfaces of the silver particles, the content of the amine compound is preferably about 5 mass % to 55 mass % with respect to the total amount of the composition. When the fatty acid is attached to the surfaces of the silver particles, the content of the fatty acid is preferably about 0.1 mass % to 20 mass % with respect to the total amount of the composition. When the hydroxy fatty acid is attached to the surfaces of the silver particles, the content of the hydroxy fatty acid is preferably about 0.1 mass % to 15 mass % with respect to the total amount of the composition.

It is also possible to synthesize silver particles once using a composition for preparing silver particles that has been adjusted such that the content of the amine compound or the like becomes outside the above range, and adjust the type and attached amount of the amine compound or the like to be the above physical properties (substitute the amine compound) by a method described below.

Means for mixing the respective components is not particularly limited, and it is possible to mix the respective components, for example, with a general-purpose device such as a mechanical stirrer, a magnetic stirrer, a vortex mixer, a planetary mill, a ball mill, a triple roll mill, a line mixer, a planetary mixer, or a dissolver. In order to avoid the silver particles from starting a thermal decomposition reaction by an increase in temperature of the composition due to an influence of, for example, heat of dissolution or heat of friction during mixing, it is preferable to mix the components while keeping the temperature of the composition at, for example, 60° C. or lower, particularly, 40° C. or lower.

Next, the composition for preparing silver particles is reacted in a reaction vessel, usually reacted by heating to cause a thermal decomposition reaction of the silver compound and thus generate silver particles. For the reaction, the composition may be introduced into the reaction vessel that has been heated in advance or the composition may be heated after introduced into the reaction vessel.

The reaction temperature may be any temperature that allows progress of the thermal decomposition reaction and generation of the silver particles, and is, for example, about 50 to 250° C. The reaction time may be appropriately selected according to the size of a desired average particle size and the constitution of the composition corresponding to the size of the desired average particle size. The reaction time is, for example, 1 minute to 100 hours.

Since the silver particles generated by the thermal decomposition reaction are obtained as a mixture containing an unreacted raw material, it is preferable to purify the silver particles. Examples of a purifying method include a solid-liquid separation method and a precipitation method of using a difference in specific gravity between silver particles and an unreacted raw material such as an organic solvent. Examples of the solid-liquid separation method include methods such as filter filtration, centrifugation, cyclone-type separation, and decantation. In order to facilitate handling of the mixture during purification, the mixture containing the silver particles may be diluted with a low-boiling-point solvent such as acetone or methanol to adjust the viscosity of the mixture.

It is possible to adjust the average particle size of silver particles to be obtained by adjusting the constitution of the composition for producing silver particles, and reaction conditions.

Method for Substituting and Adjusting Amine Compound on Silver Particle Surface

The silver particles (having an amine compound attached to surfaces thereof) once synthesized by the above method are prepared and dispersed in a solvent. Examples of the solvent include the same solvents as those exemplified as the solvent to be blended in the electroconductive adhesive described below. Next, another amine compound is added in an amount in a range of 0.1 to 5 times the mass of the silver particles, and the mixture is subjected to a step of stirring at room temperature to 80° C. for 1 minute to 24 hours, whereby the type of the amine compound attached to the surfaces of the silver particles can be substituted or the attached amount thereof can be adjusted. The silver particles in which the amine compound is substituted can be recovered by the above-described solid-liquid separation method or the like.

3. Sintered Body of Electroconductive Adhesive

A sintered body of the electroconductive adhesive of the present invention is obtained by sintering the electroconductive adhesive of the present invention described above in detail in "1. Electroconductive Adhesive" above. In the sintered body of the electroconductive adhesive of the present invention, most of the component (such as the amine compound) attached to the surfaces of the silver particles and the solvent are separated by high heat during sintering, so that the sintered body is substantially formed of silver.

The sintering temperature is not particularly limited, but is, for example, 250° C. or lower, preferably about 150° C. to 250° C., and more preferably about 200° C. to 250° C., from the viewpoint of increasing the shear strength and denseness of a sintered body to be obtained while suitably sintering at a low temperature. From the same viewpoint, the sintering time is preferably about 0.4 hours to 2.0 hours and more preferably about 0.5 hours to 1.5 hours. The sintering time refers to a main sintering time (for which a predetermined temperature is maintained after reaching the predetermined temperature), and in addition to this, preliminary baking (a step of mildly heating at a low temperature of 100° C. or lower before reaching the predetermined temperature) may be performed. In the present invention, by satisfying that the electroconductive adhesive contains the silver particles 1 having an average particle size of 20 to 500 nm and a solvent, and the moisture content of the solvent in the electroconductive adhesive is 1300 ppm or less, the electroconductive adhesive is suitably sintered at a low temperature of 250° C. or lower even without pressurization during sintering of the electroconductive adhesive to form a sintered body having high denseness and a high mechanical strength (shear strength). Therefore, it is not essential to pressurize the electroconductive adhesive of the present invention during sintering. That is, the electroconductive adhesive of the present invention can be suitably used for use applications in which the electroconductive adhesive is used without pressurization during sintering. The pressure may be applied at the time of sintering the electroconductive adhesive of the present invention, and the pressure in the case of pressurization is, for example, about 10 to 30 MPa. The sintering can be performed in an atmosphere of air, an inert gas (nitrogen gas or argon gas), or the like. Sintering means is not particularly limited, and examples thereof include an oven, a hot air drying furnace, an infrared drying furnace, laser irradiation, flash lamp irradiation, and a microwave.

The sintered body of the electroconductive adhesive of the present invention is obtained by uniformly applying the electroconductive adhesive onto a substrate and sintering the electroconductive adhesive at a predetermined temperature, but the film thickness at the time of applying the electroconductive adhesive to the substrate can be appropriately adjusted according to the purpose, and may be, for example, a thickness of about 10 to 100 μm. When a large (for example, about 10 m×10 mm) semiconductor chip is used, a semiconductor chip having a larger film thickness is preferred, and thus the film thickness when the electroconductive adhesive is applied to the substrate may be, for example, 30 μm or more, and is preferably 40 μm or more and more preferably 50 μm or more. The upper limit value of the film thickness in this case may be 200 µm or less, and is preferably 100 µm or less. By setting the film thickness as described above, even when a large semiconductor chip is used, a sufficient shear strength is obtained, and a sintered body in which cracking or chipping and voids or cracks are hardly generated is obtained.

The sintered body of the present invention preferably satisfies at least one of the shear strength and the denseness described in the section of "1. Electroconductive Adhesive". Measurement methods of these are as described in the sections of <Shear Strength> and <Denseness>.

4. Electronic Component

An electronic component of the present invention includes a portion where members are bonded by the sintered body of the present invention. That is, in the electronic component of the present invention, the electroconductive adhesive of the present invention described in detail in "1. Electroconductive Adhesive" above is disposed between members of the electronic component (for example, between members included in a circuit), and the electroconductive adhesive is sintered to bond the members to each other.

As described above, since the sintered body of the present invention has high denseness and a high shear strength, the electronic component including this sintered body also has a high shear strength between the members. The specific resistance value of the electronic component of the present invention can also be low.

EXAMPLES

The present invention will be more specifically described in the following Examples; however, the present invention is not limited thereto.

Details of each component used in Examples and Comparative Examples are as follows.

Silver oxalate ((COOAg)2) was synthesized by the method described in JP 5574761 B2.
N,N-Diethyl-1,3-diaminopropane (manufactured by FUJIFILM Wako Pure Chemical Corporation)
n-Hexylamine (manufactured by FUJIFILM Wako Pure Chemical Corporation)
Ricinoleic acid (manufactured by Tokyo Chemical Industry Co., Ltd.)
1-Butanol (manufactured by FUJIFILM Wako Pure Chemical Corporation)
2-(2-Aminoethylamino)ethanol (manufactured by Tokyo Chemical Industry Co., Ltd.)
Methanol (manufactured by FUJIFILM Wako Pure Chemical Corporation)
Texanol (manufactured by FUJIFILM Wako Pure Chemical Corporation)
Diethylene glycol mono-2-ethylhexyl ether (manufactured by FUJIFILM Wako Pure Chemical Corporation)
Hexyl carbitol (manufactured by FUJIFILM Wako Pure Chemical Corporation)

REFERENCE EXAMPLES

<Moisture Absorption Test of Solvent in Air>

The following test was performed in order to measure the hygroscopicity of each solvent used for the electroconductive adhesive.

To 300-ml polyethylene mouthed bottles, 100 g of each of the solvents 1 to 6 shown in Table 1 was added, 20 g of molecular sieve was charged thereinto, and the mixture was left to stand still at room temperature (25° C.) overnight to dehydrate the moisture in the solvent. The dehydrated solvent was left to stand in an environment of a relative humidity of 80% and room temperature (25° C.), and the moisture contents in each solvent after 1 hour, 3 hours, and 6 hours were measured. The measurement results are shown in Table 1. The moisture content in the solvent was measured by a method described below.

TABLE 1

| | Solvent 1 | Solvent 2 | Solvent 3 | Solvent 4 | Solvent 5 | Solvent 6 |
|---|---|---|---|---|---|---|
| Moisture content after still standing for 0 hours (ppm) | 149 | 3840 | 66 | 801 | 272 | 1000 |
| Moisture content after still standing for 1 hours (ppm) | 1010 | 3990 | 871 | 1500 | 1400 | 1180 |
| Moisture content after still standing for 3 hours (ppm) | 4020 | 5430 | 4070 | 6000 | 6310 | 3930 |
| Moisture content after still standing for 6 hours (ppm) | 6820 | 6820 | 8090 | 12670 | 10210 | 7700 |

Solvent 1) Texanol (manufactured by FUJIFILM Wako Pure Chemical Corporation)
Solvent 2) α-Terpineol (manufactured by FUJIFILM Wako Pure Chemical Corporation)
Solvent 3) Diethylene glycol mono-2-ethylhexyl ether (manufactured by FUJIFILM Wako Pure Chemical Corporation)
Solvent 4) Butyl carbitol (manufactured by FUJIFILM Wako Pure Chemical Corporation)
Solvent 5) Hexyl carbitol (manufactured by FUJIFILM Wako Pure Chemical Corporation)
Solvent 6) 2-Ethyl-1,3-hexanediol (manufactured by FUJIFILM Wako Pure Chemical Corporation)

As shown in Table 1, it was found that various solvents used for the electroconductive adhesive easily absorb moisture in the air in a short time.

Synthesis Example 1

Synthesis Example of Silver Particles 1 (Average Particle Size: 68 nm)

Ricinoleic acid (2.34 g), N,N-diethyl-1,3-diaminopropane (203 g), and 1-butanol (375 g) were charged into 50-mL glass-made centrifuge tubes each having a magnetic stirrer placed therein, the mixture was stirred for about 1 hour, and then, silver oxalate (250 g) was charged into each of the centrifuge tubes and stirred for about 10 minutes to obtain a composition for preparing silver particles 1. Thereafter, these glass-made centrifuge tubes were set upright on a hot stirrer equipped with an aluminum block (HHE-19G-U manufactured by KOIKE PRECISION NSTRUMENTS), and the composition was stirred at 40° C. for 30 minutes and further stirred at 90° C. for 30 minutes. After the composition was allowed to cool, the magnetic stirrer was taken out, 15 g of methanol was added to each composition and stirred with a vortex mixer, the composition was then subjected to a centrifugal operation for 1 minute at 3000 rpm (about 1600×G) by a centrifugal machine (CF7D2 manufactured by Hitachi Koki Co., Ltd.), and the centrifuge tube was inclined to remove a supernatant. The step of addition of 15 g of methanol, stirring, centrifugation, and removal of a supernatant was repeated two times, and silver particles were recovered.

Next, using a dispersion (methanol solution) of the obtained silver particles, n-hexylamine was added in an amount of 3 times the mass of the silver particles and the mixture was stirred at room temperature for 4 hours. After the stirring, the magnetic stirrer was taken out, 15 g of methanol was added to each composition and stirred with a vortex mixer, the composition was then subjected to a centrifugal operation for 1 minute at 3000 rpm (about 1600×G) by a centrifugal machine (CF7D2 manufactured by Hitachi Koki Co., Ltd.), and the centrifuge tube was inclined to remove a supernatant. The step of addition of 15 g of methanol, stirring, centrifugation, and removal of a supernatant was repeated two times, and silver particles 1 (average particle size: 68 nm) in which the protective layer attached to the surface of the silver particles was substituted with n-hexylamine were recovered.

For the silver particles 1, observation (acquisition of an SEM image) with a scanning electron microscope and measurement of an average particle size (volume-based average particle size) were performed under the following conditions.

<Observation with Electron Microscope>

For the silver particles 1, an SEM image was acquired using a scanning electron microscope (SEM (JSM-IT500HR manufactured by JEOL Ltd.)). FIG. 1 shows an SEM image of the silver particles 1.

Synthesis Example 2

>Synthesis Example of Silver Particles 3 (Average Particle Size: 440 nm)

2-(2-Aminoethylamino)ethanol (2.91 g) and 1-butanol (6.0 g) were charged into 50-mL glass-made centrifuge tubes each having a magnetic stirrer placed therein, the mixture was stirred for about 1 hour, and then, silver oxalate (4.0 g) was charged into each of the centrifuge tubes and stirred for about 10 minutes to obtain a composition for preparing silver nanoparticles. Thereafter, these glass-made centrifuge tubes were set upright on a hot stirrer equipped with an aluminum block (HHE-19G-U manufactured by KOIKE PRECISION INSTRUMENTS), and the composition was stirred at 40° C. for 30 minutes and further stirred at 90° C. for 30 minutes. After the composition was allowed to cool, the magnetic stirrer was taken out, 15 g of methanol was added to each composition and stirred with a vortex mixer, the composition was then subjected to a centrifugal operation for 1 minute at 3000 rpm (about 1600×G) by a centrifugal machine (CF7D2 manufactured by Hitachi Koki Co., Ltd.), and the centrifuge tube was inclined to remove a supernatant. The step of addition of 15 g of methanol, stirring, centrifugation, and removal of a supernatant was repeated two times, and silver particles 3 thus produced were recovered.

Next, using a dispersion (methanol solution) of the obtained silver particles, n-hexylamine was added in an amount of 3 times the mass of the silver particles and the mixture was stirred at room temperature for 4 hours. After the stirring, the magnetic stirrer was taken out, 15 g of methanol was added to each composition and stirred with a vortex mixer, the composition was then subjected to a centrifugal operation for 1 minute at 3000 rpm (about 1600×G) by a centrifugal machine (CF7D2 manufactured by Hitachi Koki Co., Ltd.), and the centrifuge tube was inclined to remove a supernatant. The step of addition of 15 g of methanol, stirring, centrifugation, and removal of a supernatant was repeated two times, and silver particles 3 (average particle size: 440 nm) in which the protective layer attached to the surface of the silver particles was substituted with n-hexylamine were recovered.

<Production of Electroconductive Adhesive>

Silver particles 1 and a solvent (diethylene glycol mono-2-ethylhexyl ether, texanol, or hexyl carbitol) were mixed so as to have the composition (mass ratio) shown in Table 2, thereby preparing an electroconductive adhesive. Specifically, first, diethylene glycol mono-2-ethylhexyl ether, texanol, or hexyl carbitol corresponding to 10 mass % was added to the silver particles 1 to prepare each silver particle dispersion (silver particle dispersion 1-1:diethylene glycol mono-2-ethylhexyl ether, silver particle dispersion 1-2:texanol, and silver particle dispersion 1-3:hexyl carbitol, respectively) having a concentration of 90 mass %. For mixing, MAZERUS TAR manufactured by KURABO INDUSTRIES LTD. was used, and mixing was performed with a two-time stirring priority mode. Thus, respective electroconductive adhesives having the compositions of Examples 1, 2, and 4 and Comparative Examples 1, 2, and 4 were obtained. In Examples, 100 g of molecular sieve was used with respect to 1000 g of the solvent and a solvent in which the moisture content was adjusted (diethylene glycol mono-2-ethylhexyl ether; moisture content: 150 ppm or less, texanol; moisture content: 100 ppm or less, hexyl carbitol; moisture content: 100 ppm or less) was used, and in Comparative Examples, a solvent in which the moisture content was not adjusted (diethylene glycol mono-2-ethylhexyl ether; moisture content: 1700 ppm or less, texanol; moisture content: 1360 ppm or less, hexyl carbitol; moisture content: 2000 ppm or less) was used. The moisture content of the solvent used in Examples was measured by a method described below.

Silver particles 1, silver particles 2 having an average particle size of 0.65 μm (product name: AG2-1C manufactured by DOWA Electronics Materials Co., Ltd.), and a solvent (texanol) were mixed so as to have the composition (mass ratio) shown in Table 2, thereby preparing an electroconductive adhesive. Specifically, first, texanol corresponding to 10 mass % was added to each of the silver particles 1 and the silver particles 2 to prepare each silver particle dispersion (silver particle dispersion 1-2, silver particle dispersion 2) having a concentration of 90 mass %. For mixing, MAZERUSTAR manufactured by KURABO INDUSTRIES LTD. was used, and mixing was performed with a two-time stirring priority mode. Next, the respective silver particle dispersions and texanol were mixed so as to have the compositions (mass ratios) shown in Table 2, thereby obtaining respective electroconductive adhesives including the compositions of Example 3 and Comparative Example 3. In Examples, 100 g of molecular sieve was used with respect to 1000 g of the solvent and a solvent in which the amount of water was adjusted (texanol; the amount of water: 100 ppm or less) was used, and in Comparative Examples, a solvent in which the amount of water was not adjusted (texanol; the amount of water: 1360 ppm or less) was used. The amount of water of the solvent used in Examples was measured by a method described below.

<Method for Measuring Moisture Content of Solvent in Electroconductive Adhesive>

For moisture measurement, the moisture content of the solvent in the electroconductive adhesive was measured using a Karl Fischer moisture meter CA-21 (manufactured by Nittoseiko Analytech Co., Ltd.). Specifically, into a moisture meter cell, 0.200 g of the solvent was directly injected, and the moisture content of the solvent was calculated from the moisture detection amount/the solvent injection amount with the moisture detection amount when the detection amount was less than 0.30 μg/s as the end point.

resin-embedded sintered body was cut with a precision low-speed cutting machine TechCut4 (manufactured by ALLIED HIGH TECH PRODUCTS, INC.), and cross-section milling was performed for 3 hours by an ion milling (IM4000PLUS) (manufactured by Hitachi High-Technologies Corporation). The cross-section milling was performed by irradiating ion beams with a swing of ±30° at an argon gas flow rate of 0.07 cm3/min and at a discharge voltage of 1.5 kV and an acceleration voltage of 6 kV. The cross-section of the sintered body obtained by the cross-section milling was observed with a scanning electron microscope

TABLE 2

| Electroconductive adhesive | | Example 1 | Comparative Example 1 | Example 2 | Comparative Example 2 | Example 3 | Comparative Example 3 | Example 4 | Comparative Example 4 |
|---|---|---|---|---|---|---|---|---|---|
| Composition (parts by mass) | Silver particles 1 | 90 | 90 | 90 | 90 | 90 | 90 | 45 | 45 |
| | Silver particles 2 | | | | | | | 45 | 45 |
| | Solvent 1 *1 | 10 | 10 | | | | | | |
| | Solvent 2 *2 | | | 10 | 10 | | | 10 | 10 |
| | Solvent 3 *3 | | | | | 10 | 10 | | |
| Moisture content of solvent (ppm) | | 150 | 1700 | 100 | 1360 | 100 | 2000 | 100 | 1360 |

*1 Diethylene glycol mono-2-ethylhexyl ether
*2 Texanol
*3 Hexyl carbitol

<Production of Sintered Body (Sintering Temperature 200° C.)>

First, a substrate with non-electrolytic silver plating of 0.5 μm on a copper plate was prepared. Each electroconductive adhesive was uniformly applied onto the substrate (surface on which silver plating or gold plating was formed) to form a coating film such that the thickness of the coating film reached 50 to 100 μm. A silicon wafer (size 2 m×2 mm) having a rear surface (surface in contact with the electroconductive adhesive) thereof subjected to gold plating was laminated on the coating film to obtain a laminate. Next, the obtained laminate was heated using a drier (circulation type) under sintering conditions of a predete rmined sintering temperature (200° C.) and 60 minutes, and each electroconductive adhesive between the substrate and the silicon wafer was sintered to nine laminates in which the substrate and the silicon wafer were joined with the sintered body interposed therebetween. The sintered body was prepared so as to have a thickness after sintering of 30 μm to 90 μm.

Various physical properties of each sintered body obtained from the electroconductive adhesives of Examples 1 to 4 and Comparative Examples 1 to 4 were measured under the following measurement conditions. The results of Example 1 and Comparative Example 1 are shown in Table 3, the results of Example 2 and Comparative Example 2 are shown in Table 4, the results of Example 3 and Comparative Example 3 are shown in Table 5, and the results of Example 4 and Comparative Example 4 are shown in Table 6.

<Mechanical Strength (Shear Strength) of Sintered Body>

For each of the obtained laminates, a load was applied to the sintered body under the condition of 0.120 mm/s at room temperature using a bond tester (SS30-WD manufactured by SEISHIN TRADING CO., LTD.), and a die shear test of each laminate was performed to measure the maximum load at break. The maximum load thus obtained was divided by the joining area to obtain a shear strength value. The measurement result is an average value of nine gold-plated silicon wafers whose shear strength has been measured.

<Denseness of Sintered Body>

Each sintered body was embedded in a resin together with the laminate with an epoxy resin (manufactured by Bühler), and left to stand still for 24 hours to cure the resin. Next, the JSM-IT500HR (manufactured by JEOL Ltd.) to acquire an SEM image. For the observation, a range with a lateral width of 10 μm was observed in a field of view at a magnification of 10000 at an acceleration voltage of 20 kV using an SED mode (secondary electron detector). The denseness was calculated by converting the obtained SEM image into two gradations of white and black by binarization software "Image J" and determining the denseness by the following relational expression.

Denseness (%)=Sintered silver area (number of white pixels)÷Sintered body total area {sintered silver area (number of white pixels)+Pore area (number of black pixels)}×100

<Film Defect>

Figure 2:
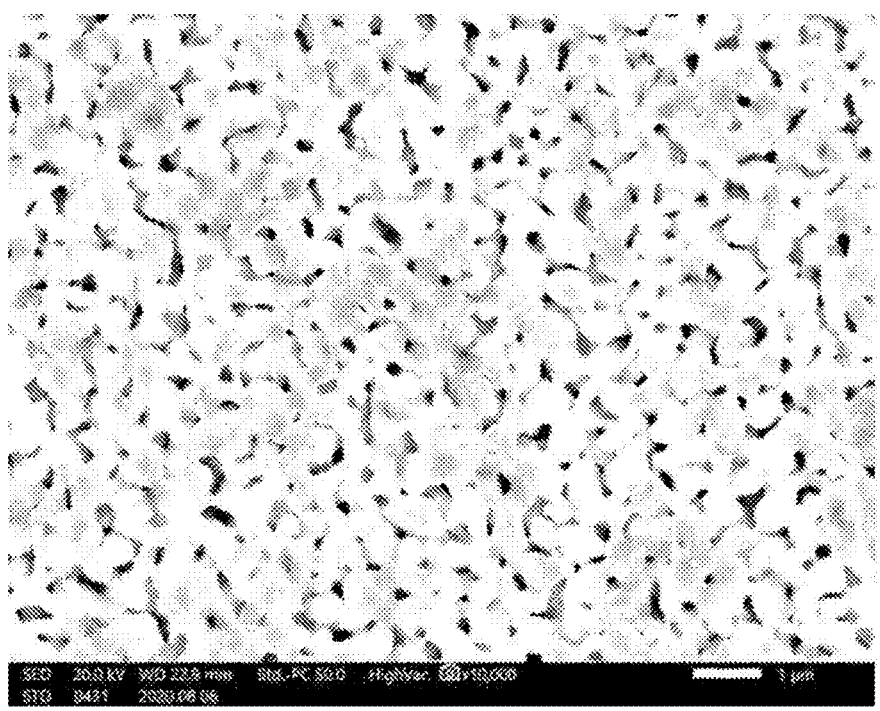
FIG. 2 shows an SEM cross-sectional photograph of a sintered body of Example 1.
Figure 3:
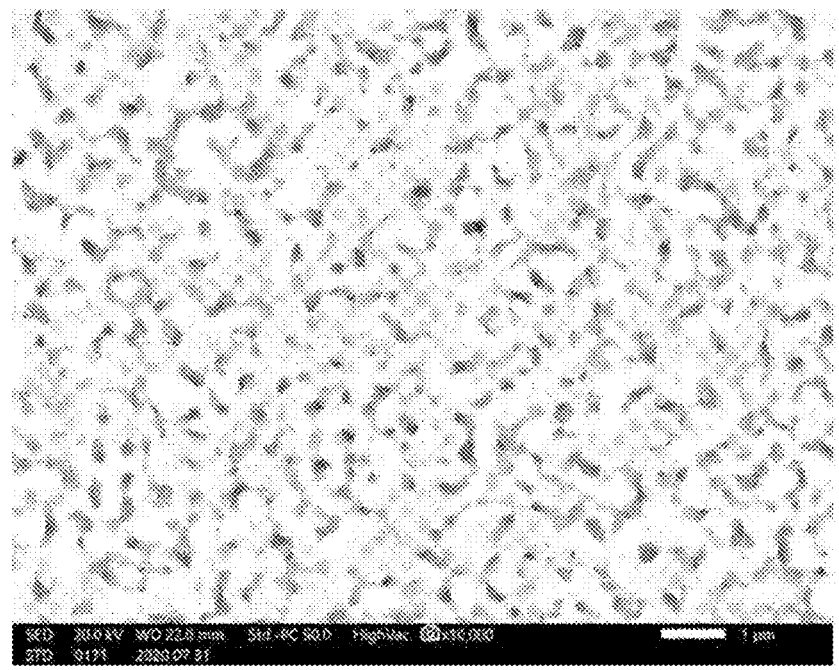
FIG. 3 shows an SEM cross-sectional photograph of a sintered body of Comparative Example 1.
Figure 4:
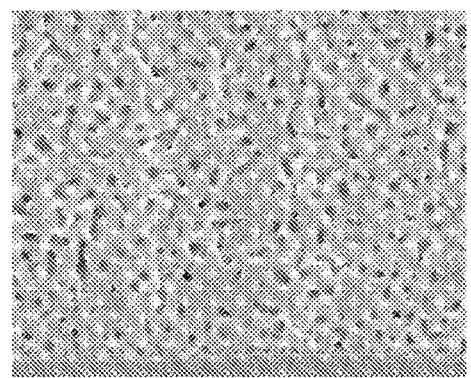
FIG. 4 shows a cross-sectional SEM photograph of a sintered body of Example
Figure 5:
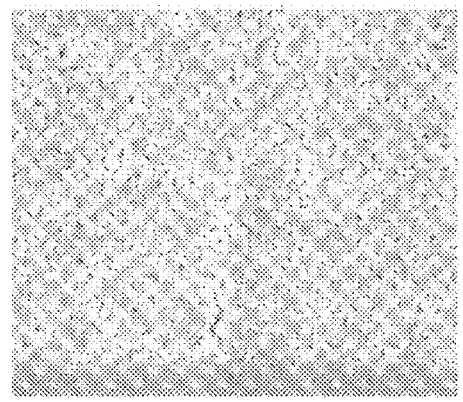
FIG. 5 shows a cross-sectional SEM photograph of a sintered body of Comparative Example 3.

The surface of each obtained sintered body was visually observed, and the presence or absence of cracking or chipping of the sintered body was evaluated. In the cross-sectional SEM image of each obtained sintered body, the entire cross-sectional view was observed at a magnification of 50 to 2000, and the presence or absence of voids or cracks was evaluated. The results of presence or absence of these film defects are shown in Tables 3, 4, and 5. For the obtained sintered bodies, FIG. 2 shows a cross-sectional SEM photograph of the sintered body of Example 1, FIG. 3 shows a cross-sectional SEM photograph of the sintered body of Comparative Example 1, FIG. 4 shows a cross-sectional SEM photograph of the sintered body of Example 3, and FIG. 5 shows a cross-sectional SEM photograph of the sintered body of Comparative Example 3.

TABLE 3

| | Example 1 | Comparative Example 1 |
|---|---|---|
| Shear strength (MPa) | 48 | 22 |
| Denseness (%) | 92 | 77 |
| Presence or absence of cracking or chipping | Absent | Present |
| Presence or absence of voids or cracks | Absent | Present |

As shown in Table 3, the electroconductive adhesive of Example 1 in which the moisture content of the solvent in the electroconductive adhesive was controlled to 1300 ppm or less was suitably sintered at a low temperature even without pressurization during sintering of the electroconductive adhesive to form a sintered body having high denseness and a high mechanical strength (shear strength). On the other hand, in the electroconductive adhesive of Comparative Example 1 in which the moisture content of the solvent in the electroconductive adhesive was more than 1300 ppm, the shear strength of the sintered body thus obtained was reduced as compared with Example 1, and generation of cracking or chipping or generation of voids or cracks was observed in the sintered body. This is considered to be because a decrease in denseness of the sintered body is largely involved, and the sinterability of the silver particles 1 is deteriorated. The sintered body of Comparative Example 1 had lots of cracking or chipping and low denseness.

TABLE 4

| | Example 2 | Comparative Example 2 |
|---|---|---|
| Shear strength (MPa) | 70 | 49 |
| Presence or absence of cracking or chipping | Absent | Present |
| Presence or absence of voids or cracks | Absent | Present |

As shown in Table 4, the electroconductive adhesive of Example 2 in which the moisture content of the solvent in the electroconductive adhesive was controlled to 1300 ppm or less was suitably sintered at a low temperature even without pressurization during sintering of the electroconductive adhesive to form a sintered body having high denseness and a high mechanical strength (shear strength). On the other hand, in the electroconductive adhesive of Comparative Example 2 in which the moisture content of the solvent in the electroconductive adhesive was more than 1300 ppm, the shear strength of the sintered body thus obtained was reduced as compared with Example 2, and generation of cracking or chipping or generation of voids or cracks was observed in the sintered body.

<Thermal Shock Test of Sintered Body>

Figure 6:
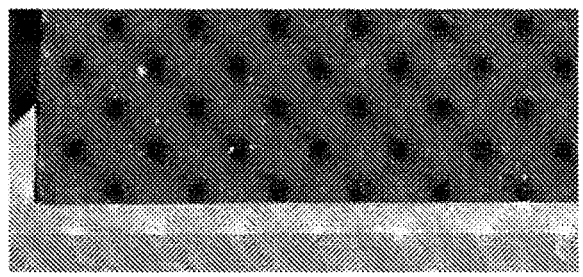
FIG. 6 shows a cross-sectional SEM photograph of the sintered body of Example 3 after a thermal shock test is performed for 300 cycles.
Figure 7:
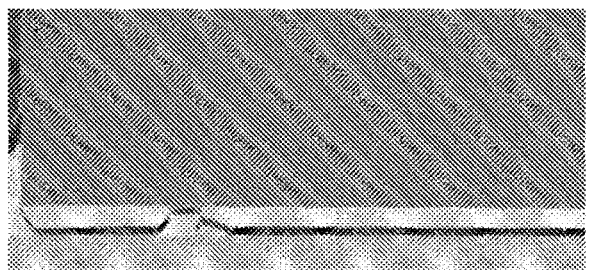
FIG. 7 shows a cross-sectional SEM photograph of the sintered body of Comparative Example 3 after a thermal shock test is performed for 300 cycles.

The laminates obtained in Example 3 and Comparative Example 3 were subjected to 300 cycles of a thermal shock test in which the laminates were each held at a temperature between −65° C. and 150° C. for 10 minutes. The results obtained by performing the shear strength measurement before and after the test are shown in Table 5. The joined state at the interface between the sintered body and the silicon wafer was observed from the SEM cross-section of the sintered body after the test. A case where the joined state at the interface is good was rated as "○", and a case where the joined state at the interface is poor was rated as "×". FIG. 6 shows a cross-sectional SEM photograph of the sintered body of Example 3 after a thermal shock test is performed for 300 cycles, and FIG. 7 shows a cross-sectional SEM photograph of the sintered body of Comparative Example 3 after a thermal shock test is performed for 300 cycles.

TABLE 5

| | Example 3 | Comparative Example 3 |
|---|---|---|
| Initial shear strength (MPa) | 88 | 67 |
| Joined state at interface | ○ | X |
| Shear strength after test (MPa) | 90 | 44 |

As shown in FIGS. 4 and 6, in the sintered body of Example 3, cracking or chipping was not generated, the joined state at the interface between the sintered body and the silicon wafer after the thermal shock test was good. On the other hand, as shown in FIGS. 5 and 7, in the sintered body of Comparative Example 3, cracking or chipping was generated, the joined state at the interface between the sintered body and the silicon wafer after the thermal shock test was poor. Even in a system in which the silver particles 2 are mixed, the formation of the sintered body is greatly affected, and the initial shear strength and the shear strength after the thermal shock test are decreased. This is considered to be because the denseness at the interface between the silver sintered body and the silicon wafer was particularly low.

TABLE 6

| | Example 4 | Comparative Example 4 |
|---|---|---|
| Shear strength (MPa) | 71 | 31 |
| Presence or absence of cracking or chipping | Absent | Present |
| Presence or absence of voids or cracks | Absent | Present |

As shown in Table 6, the electroconductive adhesive of Example 4 in which the moisture content of the solvent in the electroconductive adhesive was controlled to 1300 ppm or less was suitably sintered at a low temperature even without pressurization during sintering of the electroconductive adhesive to form a sintered body having high denseness and a high mechanical strength (shear strength). On the other hand, in the electroconductive adhesive of Comparative Example 4 in which the moisture content of the solvent in the electroconductive adhesive was more than 1300 ppm, the shear strength of the sintered body thus obtained when also having a large amount of moisture was reduced as compared with Example 4, and generation of cracking or chipping or generation of voids or cracks was observed in the sintered body.

<Production of Electroconductive Adhesive>

Silver particles 3 (average particle size: 440 nm) and a solvent (diethylene glycol mono-2-ethylhexyl ether or texanol) were mixed so as to have the composition (mass ratio) shown in Table 7, thereby preparing an electroconductive adhesive. Specifically, first, diethylene glycol mono-2-ethylhexyl ether or texanol corresponding to 10 mass % was added to the silver particles 3 to prepare each silver particle dispersion (silver particle dispersion 3-1:diethylene glycol mono-2-ethylhexyl ether and silver particle dispersion 3-2: texanol, respectively) having a concentration of 90 mass %. For mixing, MAZERUSTAR manufactured by KURABO INDUSTRIES LTD. was used, and mixing was performed with a two-time stirring priority mode. Thus, respective electroconductive adhesives having the compositions of Examples 5 and 6 and Comparative Examples 5 and 6 were obtained. In Examples, 100 g of molecular sieve was used with respect to 1000 g of the solvent and a solvent in which the moisture content was adjusted (diethylene glycol mono-2-ethylhexyl ether; moisture content: 130 ppm or less, texanol; moisture content: 130 ppm or less) was used, and in Comparative Examples, a solvent in which the moisture content was not adjusted (diethylene glycol mono-2-ethylhexyl ether; moisture content: 5000 ppm or less, texanol; moisture content: 5400 ppm or less) was used. The moisture content of the solvent used in Examples was measured by the method described above.

TABLE 7

| Electroconductive adhesive | | Example 5 | Comparative Example 5 | Example 6 | Comparative Example 6 |
|---|---|---|---|---|---|
| Composition (parts by mass) | Silver particles 3 | 90 | 90 | 90 | 90 |
| | Solvent 1 *1 | 10 | 10 | | |
| | Solvent 2 *2 | | | 10 | 10 |
| Moisture content of solvent (ppm) | | 130 | 5000 | 130 | 5400 |

*1) Diethylene glycol mono-2-ethylhexyl ether
*2) Texanol

A sintered body was produced from each electroconductive adhesive by the same method as in Example 1 and Comparative Example 1. Various physical properties of each sintered body obtained from the electroconductive adhesives were measured under the measurement conditions described above. The results of Example 5 and Comparative Example 5 are shown in Table 8, and the results of Example 6 and Comparative Example 6 are shown in Table 9.

TABLE 8

| | Example 5 | Comparative Example 5 |
|---|---|---|
| Shear strength (MPa) | 97 | 34 |
| Presence or absence of cracking or chipping | Absent | Present |
| Presence or absence of voids or cracks | Absent | Present |

As shown in Table 8, the electroconductive adhesive of Example 5 in which the moisture content of the solvent in the electroconductive adhesive was controlled to 1300 ppm or less was suitably sintered at a low temperature even without pressurization during sintering of the electroconductive adhesive to form a sintered body having high denseness and a high mechanical strength (shear strength). On the other hand, in the electroconductive adhesive of Comparative Example 5 in which the moisture content of the solvent in the electroconductive adhesive was more than 1300 ppm, the shear strength of the sintered body thus obtained was reduced as compared with Example 2, and generation of cracking or chipping or generation of voids or cracks was observed in the sintered body.

TABLE 9

| | Example 6 | Comparative Example 6 |
|---|---|---|
| Shear strength (MPa) | 88 | 44 |
| Presence or absence of cracking or chipping | Absent | Present |
| Presence or absence of voids or cracks | Absent | Present |

As shown in Table 9, the electroconductive adhesive of Example 6 in which the moisture content of the solvent in the electroconductive adhesive was controlled to 1300 ppm or less was suitably sintered at a low temperature even without pressurization during sintering of the electroconductive adhesive to form a sintered body having high denseness and a high mechanical strength (shear strength). On the other hand, in the electroconductive adhesive of Comparative Example 6 in which the moisture content of the solvent in the electroconductive adhesive was more than 1300 ppm, the shear strength of the sintered body thus obtained was reduced as compared with Example 6, and generation of cracking or chipping or generation of voids or cracks was observed in the sintered body.

The invention claimed is:

1. A method for producing a sintered body, the method comprising:
    (a) removing moisture from an electroconductive adhesive containing silver particles and a solvent, wherein a moisture content of the solvent in the electroconductive adhesive is 1300 ppm or less; and
    (b) sintering the electroconductive adhesive with the solvent having a moisture content of 1300 ppm or less at a temperature of 150° C. or higher and 250° C. or lower.

2. The method of claim 1, wherein an amine compound is attached to surfaces of the silver particles.

\* \* \* \* \*